United States Patent
Bernardo et al.

(10) Patent No.: US 11,877,578 B2
(45) Date of Patent: Jan. 23, 2024

(54) COMPOSITION FOR BIOLOGICALLY CONTROLLING PHYTOPATHOGENIC FUNGI

(71) Applicant: Agrivalle Brasil Indústria e Comércio de Produtos Agrícolas Ltda., Salto (BR)

(72) Inventors: Eduardo Roberto de Almeida Bernardo, Indaiatuba (BR); Tiago Domingues Zucchi, Indaiatuba (BR)

(73) Assignee: AGRIVALLE BRASIL INDÚSTRIA E COMÉRCIO DE PRODUTOS AGRÍCOLAS LTDA., Salto (BR)

( * ) Notice: Subject to any disclaimer, the term of this patent is extended or adjusted under 35 U.S.C. 154(b) by 0 days.

(21) Appl. No.: 16/626,131

(22) PCT Filed: Sep. 6, 2018

(86) PCT No.: PCT/BR2018/050325
§ 371 (c)(1),
(2) Date: Dec. 23, 2019

(87) PCT Pub. No.: WO2019/222819
PCT Pub. Date: Nov. 28, 2019

(65) Prior Publication Data
US 2021/0059261 A1 Mar. 4, 2021

(30) Foreign Application Priority Data
May 23, 2018 (BR) ...................... 10 2018 010543-4

(51) Int. Cl.
*A01N 63/38* (2020.01)
*A01N 63/22* (2020.01)

(52) U.S. Cl.
CPC ............. *A01N 63/38* (2020.01); *A01N 63/22* (2020.01)

(58) Field of Classification Search
CPC ................................ A01N 63/22; A01N 63/38
See application file for complete search history.

(56) References Cited

U.S. PATENT DOCUMENTS

2017/0181435 A1* 6/2017 Nave ...................... A01N 57/28

FOREIGN PATENT DOCUMENTS

| WO | WO-2015104698 A2 * | 7/2015 | ............. A01N 31/14 |
| WO | WO-2016196681 A1 * | 12/2016 | ............. C05F 11/08 |

OTHER PUBLICATIONS

U.S. Appl. No. 17/285,247 (Year: 2021).*

* cited by examiner

*Primary Examiner* — Ruth A Davis
(74) *Attorney, Agent, or Firm* — B. Aaron Schulman, Esq.; Stites & Harbison, PLLC

(57) ABSTRACT

A composition for biologically controlling phytopathogenic fungi that pertains to the agricultural biotechnology area, more particularly a composition of bacteria and fungi with different complementary mechanisms of action in the mitigation of phytopathogenic fungi in crops. The composition is a formulation containing *Bacillus amyloliquefaciens* and *Trichoderma harzianum* mixed with additives and excipients. Micro-organism *Clonostachys rosea* can also be added.

4 Claims, No Drawings

COMPOSITION FOR BIOLOGICALLY CONTROLLING PHYTOPATHOGENIC FUNGI

FIELD OF THE INVENTION

The present invention is directed to a composition for biologically controlling phytopathogenic fungi that pertains to the agricultural biotechnology area, more particularly a composition of bacteria and fungi with different complementary mechanisms of action in the mitigation of phytopathogenic fungi in crops. The composition is a formulation containing *Bacillus amyloliquefaciens* and *Trichoderma harzianum* mixed to additives and excipients. Optionally, micro-organism *Clonostachys rosea* can also be added.

BACKGROUND OF THE INVENTION

*Rhizoctonia solani* Kuhn and *Sclerotinia sclerotiorum* (Lib.) de Bary, agents that cause damping off and white mildew, respectively, are two of the more aggressive phytopathogenic fungi in commercial crops (Bolton et al. 2006; Faltin et al. 2004). Both are capable of infecting a large range of hosts worldwide, resulting in considerable losses (Boland & Hall 1994; Ohkura et al. 2009).

A survey conducted in 2006 estimated that the losses attributed to the damages caused by white mildew (*S. sclerotiorum*) in the U.S.A. amount to about US$200 million per year (Bolton et al., 2006). Concomitantly, the losses caused by *Rhizoctonia solani* in soy, also in the U.S.A., have been estimated to be more than 3 million hectares between years 2006 and 2009 (Koenning & Wrather, 2010).

The control of such fungi has been shown to be particularly complicated, mainly because of:
  a) the capacity to produce resistant structures, sclerotia, that make it possible to survive in adverse soil conditions for many years;
  b) the saprophytic activities of the fungi;
  c) the diversity of hosts;
  d) the absence of resistant cultivars for some crops; and
  e) the selection of lineages resistant to chemical pesticides (Bardin & Huang 2001; Campion et al., 2003; Ogoshi, 1996; Zhang et al., 2009).

Among these factors, the use of agricultural pesticides has been considered one of the crucial points in the control of agricultural pests; however, the indiscriminate use of agricultural pesticides has induced the selection of resistant populations and also caused serious sanitary and environmental problems. Moreover, in view of the harmful effects caused by food contaminated with agricultural pesticides, there has been an increase of these products in the public perception, culminating in a need for alternate control strategies.

In this context, the use of micro-organisms to mitigate the damages caused by phytopathogens has been considered to be a viable option. This strategy, known as biological control, has some advantages in relation to other technologies, mainly because there is little or no toxicity at all for human beings and animals, and the strategy makes it possible to explore mechanisms of action distinct from those of chemical pesticides (Zucchi et al. 2008).

Many antagonistic micro-organisms or microparasites have been reported and used for biologically controlling several phytopathogenic fungi. In general, bacteria antagonistic to phytopathogenic fungi (e.g., *Bacillus*, *Streptomyces*, *Pseudomonas*, etc.) have their mechanisms of action associated with the production of secondary compounds and lytic enzymes (Raajimakers et al. 2002; Fernando et al., 2007; Canova et al. 2010; Zucchi et al. 2010). In the case of fungi commonly used in biological control programs, added to these characteristics is the capacity of parasitizing fungal phytopathogens, e.g., *Trichoderma* spp. parasitizing *Sclerotinia sclerotiorum* (Abdullah et al. 2008) and *Clonostachys rosea* parasitizing *Botrytis cinerea* (Huang et al. 2002).

This versatility in the action exhibited by biological control organisms has been largely explored. Isolates of several species are commercialized and oftentimes they provide results equal to or higher than those of chemical defensives. The beneficial effect of such mechanisms of action can also be expanded when formulations having more than one organism are used. However, despite the fact that related research demonstrates the relatively superior effectiveness of such mixtures, the commercial use thereof is still incipient (Siddiqui 2005). One of the reasons for the low commercialization of products containing mixtures of biological control agents is indeed the difficulty in stabilizing such formulations and, in the case of Brazil, bureaucratic impediments involved in the registration thereof. However, mixed formulations have been used for other agricultural purposes, such as for controlling phytonematodes (US 20150050258A1; BR 1020170006735) and plant growth promoting micro-organisms (US20090308121Aa), signaling a new field for the control of phytopathogens: the use of complex microbiological compositions for the control of such micro-organisms.

Thus, the present invention aims to develop effective compositions against phytopathogenic fungi in crops that contain different complementary mechanisms of action. Such compositions involve the use of bacteria and fungi with the addition of additives and excipients.

SUMMARY OF THE INVENTION

The present invention is directed to the effective use of amounts of *Bacillus amyloliquefaciens*, *Clonostachys rosea* and *Trichoderma harzianum*, concomitantly with additives and excipients, in biological compositions for mitigating phytopathogenic fungi in crops.

DETAILED DESCRIPTION OF THE INVENTION

The composition for biologically controlling phytopathogenic fungi comprises, without any limitations, micro-organisms in colony forming units (c.f.u.) as follows:
  *Bacillus amyloliquefaciens* in $1.0 \times 10^7$ c.f.u./g;
  *Trichoderma harzianum* in $1.0 \times 10^7$ c.f.u./g;
  and optionally, *Clonostachys rosea* in $1.0 \times 10^6$ c.f.u./g.

The isolates have been identified and classified according to the Coleção Brasileira de Microrganismos de Ambiente e Indústria (CBMAI/UNICAMP) and the Instituto Biológico de Campinas, where they have been deposited.

The composition has the following concentrations:
  *Bacillus amyloliquefaciens:* 1.0 to 20.0%;
  *Trichodenna harzianum:* 1.0 to 45.0%;
  Additives: 1.0 to 10.0%; and
  Excipients: 10.0 to 96.0%.

Optionally, micro-organism *Clonostachy rosea* can be added to the composition at a concentration of 1.0 to 15.0%.

The additives can be, without any limitations, dispersants selected from the group consisting of water-soluble ionic polymers, water-soluble anionic polymers; surfactants selected from the group consisting of anionic surfactants and non-ionic surfactants; and combinations thereof.

The excipients can be, but not limited to, the group that consists of silicas, talc, bentonite, carbohydrates and combinations thereof.

The composition should be used as a wettable powder formulation. However, other formulations containing said micro-organisms such as concentrated emulsions, suspensions, granules, etc., also can be used.

PRACTICAL EXAMPLES

A composition containing 8.0% *Bacillus amyloliquefaciens,* 8.0% *Clonostachys rosea,* 4.8% *Trichoderma harzianum,* 3.0% acrylic styrene polymer, 1.0% anionic surfactant, and 75.2% inert matter was formulated to evaluate its efficiency in the control of phytopathogens. The examples below illustrate, without any limitations, the use of this composition:

Example 1: Control of *Rhizoctonia solani* in Beans

Object

To evaluate the effect, under field conditions, of the biological formulation containing antagonistic bacterial and fungal agents in the control of *Rhizoctonia solani,* applied by treating seeds.

Material and Methods

Experimental Plan: Blocks were subjected to seven treatments and four repetitions. The portions consisted of six lines, each 5 meters long, totalizing a 15 m² area. However, 1 in in each of the line ends was disregarded for the evaluation, totalizing a useful portion of 9 m².

Treatments and form of application: The effect of five doses of the formulation was evaluated (30, 70, 100, 150 and 200 g·100 kg of seeds$^{-1}$), using a negative control (without treatment) and a positive control (300 g of fluodioxonyl+metalaxyl–7.5 and 3.0% of active ingredient, respectively). The treatment of the seeds was carried out by adding water to the dose of the indicated product until a 5 ml volume was attained. Then, 500 g of bean seeds, Pearl variety, were poured into a plastic bag together with 5 ml of the mixture (product+water). The bag was closed and agitated until the products were fully homogenized, and then the seeds were sown in the area with a 0.5 in spacing between the seeding lines at a population density of 15 seeds per meter. The emergence of seedlings occurred 5 days after the seeds were sown.

Sampling and evaluation of the effectiveness of the formulation: The effect of the treatments in the study was evaluated by the number of plants per linear meter (stand) and the number of symptomatic plants in a sample of 100 plants in each useful portion. The evaluations were carried out 7, 14, 21 and 28 days after the emergence of seedlings (DAE). The average productivity of the culture was esteemed in tons per hectare, where the harvested grains were weighed in 6 m² of each useful portion.

Statistical analysis: The data of the evaluations of the stand, number of attacked plants and productivity were transformed using √x+1, and submitted to variance analysis. The comparisons of the averages were made by carrying out the Tukey test (p≤0.05) (1949), and the efficacies of the treatments were calculated according to Abbott (1925).

Results and Discussion

On the seventh day after the emergence there was no difference between the stand in bean plants in areas containing seeds treated with the biological formulation and controls. However, in the evaluation carried out on the 28$^{th}$ DAE, it was observed that the stand in the areas sown with seeds treated with the biological formulation (150 and 200 g p.c. 100 kg seeds$^{-1}$) and/or with the chemical control was substantially higher than the one presented by the control, keeping the initial stand of the crop in an interval of 83.33 to 90% (Table 1).

TABLE 1

Effect of treatments on the stand in bean plants (*P. vulgaris*) throughout the evaluations.

| Treatments | Doses g · 100 kg seeds$^{-1}$ | Days after emergence (DAE) | |
|---|---|---|---|
| | | 7* | 28* |
| Biological formulation | 30 | 13.50 a | 11.50 c |
| | 70 | 13.25 a | 11.75 bc |
| | 100 | 13.50 a | 12.00 bc |
| | 150 | 13.50 a | 12.50 ab |
| | 200 | 13.50 a | 13.00 ab |
| Chemical control** | 300 | 13.50 a | 13.50 a |
| Control | — | 13.25 a | 9.75 d |
| VC (%) | | 1.84 | 2.12 |

*averages followed by the same letter do not differ from one another in the columns as per Tukey test;
VC (%): variation coefficient.
**Fludioxonyl + metalaxyl (7.5 and 3.0%, respectively)

The treatment with the biological formulation in concentrations of 70 to 200 g p.c. 100 kg seeds$^{-1}$ and the chemical treatment presented satisfactory results that are significantly different from the control in the mitigation of root rot by *R. solani* at the seventh DAE (Table 2). It should be pointed out that the treatments with the biological formulation using doses from 100 to 200 g p.c. 100 kg seeds$^{-1}$ and the chemical treatment have prevented the infection of plants by fungus *R. solani* and consequently 100% effective against root rot. At the 28th DAE, a relative drop could be seen in the residual power of the treatments with the biological formulation which had presented control indices of up to 73.97%. This drop was significantly different and lower than the one observed in the control. However, in the same evaluation period, the chemical treatment caused a 90.41% reduction in the amount of plants damaged by *R. solani*.

TABLE 2

Effect of the treatments on the amount of bean plants with root rot by *R. solani* throughout the evaluations.

| | | Number of symptomatic plants in 100 plants per useful portion | | | |
|---|---|---|---|---|---|
| | | 7 DAE | | 28 DAE | |
| Treatments | Doses$^1$ | m | E(%) | m | E(%) |
| Biological formulation | 30 | 1.75 c | 58.82 | 13.00 c | 28.77 |
| | 70 | 0.75 b | 82.35 | 9.75 d | 46.58 |
| | 100 | 0.00 a | 100.00 | 7.25 c | 60.27 |
| | 150 | 0.00 a | 100.00 | 7.75 b | 73.97 |
| | 200 | 0.00 a | 100.00 | 5.00 b | 72.60 |

TABLE 2-continued

Effect of the treatments on the amount of bean plants with
root rot by R. solani throughout the evaluations.

| Treatments | Doses[1] | Number of symptomatic plants in 100 plants per useful portion | | | |
|---|---|---|---|---|---|
| | | 7 DAE | | 28 DAE | |
| | | m | E(%) | m | E(%) |
| Chemical control[2] | 300 | 0.00 a | 100.0 | 1.75 a | 90.41 |
| Witness | | 4.25 d | — | 18.25 f | — |
| VC (%) | | 9.77 | — | 5.28 | — |

Note:
averages followed by the same letter do not differ from one another as per Tukey test (p ≤ 0.05);
[1]g · 100 kg seeds$^{-1}$;
[2]Fludioxonyl[1] + metalaxyl (7.5 and 3.0%, respectively);
m: percentage of plants with root rot by Rhizoctonia solani in 100 plants per useful portion (average of four repetitions);
DAE: days after the emergence of seedlings;
E (%): efficacy of the treatments according to Abbott (1925);
VC (%): variation coefficient.

Finally, different treatments in the study were responsible for additions ranging from 13.75 to 24.31% in the productivity of the crop. These results demonstrate the harmful effects of root rot caused by R. solani in bean plants and the relevant benefits of controlling same by using the biological formulation (Table 3).

TABLE 3

Average productivity of bean plants (P. vulgaris) as a
function of the treatments applied for controlling root rot
by R. solani. Uberlândia, MG, August 2012.

| Treatments | Doses[1] | Productivity (ton/ha) | Relative Increment (%) |
|---|---|---|---|
| Witness | — | 15.14 b | — |
| | 30 | 17.64 ab | 16.51 |
| | 70 | 17.22 ab | 13.75 |
| Biological | 100 | 17.64 ab | 16.50 |
| Formulation | 150 | 18.06 ab | 19.25 |
| | 200 | 18.82 ab | 24.31 |
| Chemical control[2] | 300 | 20.48 a | 35.29 |
| VC (%) | | 4.58 | |
| Averages | | 4.33 | |

Note:
averages followed by the same letter do not different from one another in columns as per Tukey test (p ≤ 0.05);
ton/ha: tons per hectare;
[1]grams or milliliters of commercial product per 100 kilograms of seeds;
[2]Fludioxoryl + metalaxyl (7.5 and 3.0%, respectively);
VC (%): variation coefficient.

Example 2: Control of *Sclerotinia sclerotiorum* in Bean Plants

Object

To evaluate the effect, in field conditions, of the biological formulation containing antagonistic bacterial and fungal agents in the control of *Sclerotinia sclerotiorum*.

Material and Methods

Experimental Plan: Blocks were subjected to seven treatments and four repetitions. The portions consisted of six lines, each six meters long, totalizing a 18 m$^2$ area. However, 1 meter in each line end was disregarded for the evaluations, totalizing a useful portion of 12 cm$^2$.

Treatment and form of application: The effect of five doses of the biological formulation was evaluated (300, 500, 750 and 1,000 g·ha$^{-1}$), using a negative control (without treatment) and two positive controls: a chemical control (300 g of fludioxonyl+metalaxyl–75 and 3.0% of active ingredient, respectively) and another biological control (350 g of *Trichoderma asperellum*, 1.0×10$^{10}$ c.f.u./g).

The treatments with the biological formulation and the biological control were applied by means of foliar spraying, while the plants were at development stage 44, according to BBCH range (Weber et al., 2001). For the application, a constant pressure pressurized CO sprayer was used (60 lbf/pol$^{-2}$), provided with a bar with fan type spraying tips 110.02 and a syrup volume equivalent to 200 L·ha$^{-1}$. The chemical treatment was carried out before the seeding, in the phenologic stage (BBCH range—Weber et al., 2001).

Sampling and evaluation of the effectiveness of the formulation: Five evaluations of the incidence (%) and severity (notes from 1 to 10) of the disease were carried out, by counting the amount of symptomatic plants and the percentage of plant damaged by white mildew injuries in a sample of 100 plants per useful portion, the first evaluation being carried out before the application of the spraying treatments, and the rest 10, 20, 30 and 40 days after the application (DAA) of the treatments. The average productivity of the crop was estimated in bags per hectare by weighing the harvested grains in 6 m$^2$ of each portion. During the experiment, the crop was monitored for the purpose of registering the occurrence of any phytotoxicity symptoms caused by the products to the bean plants.

Statistical analysis: The data on the evaluations of incidence, severity and productivity were transformed using equation $\sqrt{x+1}$, and submitted to variance analysis. The area below the progress of the severity of the disease (ABPSD) curve was calculated according to Campbell and Madden (1990). The comparisons of the averages were made by carrying out Tukey test (p≤0.05) (1949), and the effectiveness of the treatments was calculated according to Abbot (1925).

Results and Discussion

At the 10$^{th}$ DAA it was not possible to determine the effect of the treatments in the study on the incidence of white mildew in bean plants, since the disease had not been installed in the experimental area (Table 4). However, at the 20$^{th}$ DAA, with the installation and evolution of the disease, it was seen that the applied treatments presented significant effects on the incidence of the disease. However, satisfactory performances were only observed in the plants treated with the biological formulation at a concentration of 1,000 g p.c·ha$^{-1}$ and in the chemical control (Fludioxonyl+metalaxyl; 7.5 and 3.0%, respectively), which did not show apparent symptoms caused by white mildew. At the 30$^{th}$ DAA, the best result was observed in the areas where the seeds had been treated with the chemical control, where 100% of the plants remained healthy, followed by the areas treated with the biological formulation, at a dose of 1,000 g p.c·ha$^{-1}$, in which the incidence of the disease was controlled at 85.71%. In the last evaluation (40 DAA), different treatments with biological formulation differed significantly from the witness at doses of 500, 750 and 1000 g p.c·ha$^{-1}$, representing a control on the incidence of the disease in an interval of 39.34 to 62.30%. Said doses presented results higher than those shown by the biological control (comprising only *T. aspergillus*), thus evidencing an improvement in the efficiency of the control of *S. sclerotiorum* when using the mixture of control agents.

TABLE 4

Effect of the treatments on white mildew incidence (*S. sclerotiorum*) in bean plants
(*P. vulgaris*) and efficacy of the treatments throughout the evaluations.

| | | Incidence (%) of white mildew in 100 plants per useful portion | | | | | | | |
|---|---|---|---|---|---|---|---|---|---|
| | | Previous | 10 DAA | 20 DAA | | 30 DAA | | 40 DAA | |
| Treatments | Doses[1] | m | m | m | E (%) | m | E (%) | m | E (%) |
| Biological | 300 | 0.00 a | 0.00 a | 2.25 b | 43.75 | 8.75 d | 44.44 | 38.75 de | 15.30 |
| Formulation | 500 | 0.00 a | 0.00 a | 1.75 b | 56.25 | 5.75 c | 63.49 | 27.75 c | 39.34 |
| | 750 | 0.00 a | 0.00 a | 1.25 b | 68.75 | 3.25 b | 79.37 | 19.25 b | 57.92 |
| | 1000 | 0.00 a | 0.00 a | 0.00 a | 100.00 | 2.25 b | 85.71 | 17.25 b | 62.30 |
| Chemical control[2] | 300 | 0.00 a | 0.00 a | 0.00 a | 100.00 | 0.00 a | 100.00 | 3.00 a | 93.44 |
| Biological control[3] | 350 | 0.00 a | 0.00 a | 1.75 b | 56.25 | 8.25 d | 47.62 | 33.75 cd | 26.23 |
| Witness | — | 0.00 a | 0.00 a | 4.00 c | — | 15.75 e | — | 45.75 e | — |
| VC (%) | | 0.00 | 0.00 | 9.00 | — | 4.80 | — | 6.18 | — |
| Averages | | 1.00 | 0.00 | 1.54 | — | 2.52 | — | 5.01 | — |

Note:
averages followed by the same letter do not differ from one another in the columns as per Tukey test ($p \leq 0.05$);
[1] grams of commercial product per hectare or milliliters of commercial product per 100 kilograms of seeds;
[2] Fludioxonyl + metalaxyl (7.5 and 3.0%, respectively);
[3] *Trichoderma asperellum* ($1.0 \times 10^{10}$ cfu · g$^{-1}$);
m: number of symptomatic plants in 100 plants per useful portion;
DAA: days after the application of the treatments;
E (%): effectiveness of the treatments according to Abbott (1925);
VC (%): variation coefficient.

The results attained for the severity of the disease (Table 5) were similar to those observed for the incidence of white mildew. At the 10$^{th}$ DAA it was not possible to determine the performance of the treatments on the severity of white mildew, since the disease was not installed in the study area. At the 20$^{th}$ DAA, with the installation of the disease, the effective control of the biological formulation at its highest dosage (1.000 g p.c·ha$^{-1}$) and the chemical control was demonstrated, thus controlling 100% of the severity of the disease, while the other treatments provided a reduction that ranged from 50.34 to 79.31%. At the 30th DAA, the severity of the disease decreased to an interval of 31.73 to 100% in the treated plants, and they were also the best results that could be observed in the treatment using the biological formulation at 1,000 g p.c·ha$^{-1}$ and in the chemical control. In said treatments the reduction was 88.27 and 100%, respectively. In the last evaluation, a drop in the residual power of the biological formulation (1,000 g p.c·ha$^{-1}$) was registered, but even so said treatment was better that the treatment using the biological control (*T. asperellum*), which did not differ from the witness.

TABLE 5

Effect of the treatments on white mildew (*S. sclerotiorum*) severity in ben plants
(*P. vulgaris*) and effectiveness of the treatments throughout the evaluations.

| | | Previous | 10 DAA | 20 DAA | | 30 DAA | | 40 DAA | | ABPSD | |
|---|---|---|---|---|---|---|---|---|---|---|---|
| Treatments | Doses[1] | m | m | m | E(%) | m | E(%) | m | E(%) | m | E(%) |
| Biological | 300 | 0.00 a | 0.00 a | 1.80 c | 50.34 | 8.88 d | 31.73 | 28.75 d | 20.69 | 62.63 f | 27.91 |
| formulation | 500 | 0.00 a | 0.00 a | 1.08 b | 70.34 | 3.75 c | 71.15 | 18.00 bc | 50.34 | 34.56 d | 60.22 |
| | 750 | 0.00 a | 0.00 a | 0.75 b | 79.31 | 3.15 bc | 75.77 | 13.50 b | 62.76 | 26.63 c | 69.35 |
| | 1,000 | 0.00 a | 0.00 a | 0.00 a | 100.00 | 1.53 b | 88.27 | 11.75 b | 67.59 | 18.50 b | 78.71 |
| Chemical control[2] | 300 | 0.00 a | 0.00 a | 0.00 a | 100.00 | 0.00 a | 100.00 | 2.38 a | 93.45 | 2.97 a | 96.58 |
| Biological control[3] | 350 | 0.00 a | 0.00 a | 1.28 bc | 64.83 | 6.65 d | 48.85 | 25.00 cd | 31.03 | 51.06 e | 41.22 |
| Witness | — | 0.00 a | 0.00 a | 3.63 d | — | 13.00 e | — | 36.25 d | — | 86.88 g | — |
| VC (%) | | 0.00 | 0.00 | 6.44 | — | 9.40 | — | 10.46 | — | 0.00 | — |
| Averages | | 1.00 | 1.00 | 1.43 | — | 2.34 | — | 4.30 | — | 6.02 | — |

Note:
averages followed by the same letter do not differ from one another in the columns as per Tukey test ($p \leq 0.05$);
DAA: days after the application of the treatments;
[1] grams of commercial product per hectare or milliliters of commercial product per 100 kilograms of seeds;
[2] Fludioxonyl + metalaxyl (7.5 and 3.0%, respectively);
[3] *Trichoderma asperellum* ($1.0 \times 10^{10}$ cfu · g$^{-1}$);
m: percentage of vegetal area damaged by white mildew per useful portion;
E (%): effectiveness of the treatments according to Abbott (1925);
ABPSD: area below the progress of the severity of the disease curve (Campbell and Madden, 1990);
VC (%): variation coefficient.

The productivity of bean plants was affected significantly by the applied treatments, registering productivity gains that ranged from 4.45 to 64.43% (Table 6). It should be pointed out that the most expressive additions were attained in the treatment of seeds with the biological formulation at a dose of 1,000 g p.c·ha$^{-1}$ and the chemical control, where the increments were 37.78 and 64.43%. Said results demonstrate the damage caused by the incidence of white mildew in bean plants and the benefits that the producer can obtain in the control of said disease by using the biological formulation.

TABLE 6

Average productivity of bean plants (*P. vulgaris*) as a function of the treatments applied for controlling white mildew.

| Treatments | Doses[1] | Productivity (sc/ha) | Relative increment (%) |
|---|---|---|---|
| Biological formulation | 300 | 16.32 c | 4.45 |
| | 500 | 17.09 c | 9.34 |
| | 750 | 18.68 bc | 19.55 |
| | 1,000 | 21.53 b | 37.78 |
| Chemical control[2] | 300 | 25.69 a | 64.43 |
| Biological control[3] | 350 | 16.46 c | 5.34 |
| Witness | — | 15.63 c | — |
| VC (%) | | 3.77 | — |
| Averages | | 4.42 | — |

Note:
averages followed by the same letter do not differ from one another in the columns as per Tukey test ($p \leq 0.05$);
[1]grams of commercial product per hectare or milliliters of commercial product per 100 kilograms of seeds;
[2]Fludioxonyl + metalaxyl (7.5 and 3.0%, respectively);
[3]*Trichoderma asperellum* (1.0 × 10$^{10}$ cfu · g$^{-1}$):
VC (%): variation coefficient.

Further, the treatments in the study do not cause any phytotoxicity symptoms to the crop.

Thus, the evaluations demonstrate that the use of the biological formulation 1 containing *B. amyloliquefaciens, C. rosea* and *T. harzianum* controls *R. solani* and *S. sclerotiorum* in bean plants, and it can be recommended in the integrated handling of said phytopathogens in the crop.

A second composition containing 8.0% *Bacillus amyloliquefaciens*, 4.8% *Trichoderma harzianum*, 3.0% acrylic styrene polymer, 1.0% anionic surfactant and 83.2% inert matter was formulated to evaluate its efficiency in the control of phytopathogens. The example below illustrates, without any limitations, the use of said composition:

Example 3. Control of *Rhizoctonia solani* in Bean Plants

Object

To evaluate the effect, in field conditions, of the biological formulation containing antagonistic bacterial and fungal agents in the control of *Rhyzoctonia solani*, applied by treatment of seeds.

Material and Methods

Experimental Plan: Blocks were subjected to seven treatments and four repetitions. The experimental portions totalized an area of 24.0 m$^2$ (8.0×3.0 in), wherein the useful portion consisted of a 14.0 m$^2$ area.

Treatment and form of application: the infection of the seeds by *R. solani* was assured by previously inoculating the phytopathogen, except for the negative control (without treatment). The fungal inoculum that has been previously preserved by the Castellani method, was put to grow for seven days at 25° C., for a photoperiod of 12 hours, in Petri plates (140×15 mm) containing BDA medium (potato dextrose agar). Then, bean seeds disinfected with sodium hypochlorite 2.0% for 30 sec were contacted with fungi for two days and kept at 25° C. and a photoperiod of 12 hours. After said period, the seeds were removed from the plates and submitted to different treatments in the study. Thus, the effect of five doses of the biological formulation was evaluated (0.45, 0.90, 1.40, 2.00 and 2.50 g p.c. kg seed$^{-1}$), using a negative control (without treatment) and an inoculated control (phytopathogen inoculated artificially). The treatment of seeds was carried out as described previously. The seedlings emerged seven days after the seeds were sown.

Sampling and evaluation of the effectiveness of the formulation: the effect of the treatments on the root rot was assayed by evaluating the incidence and the severity of the disease for a sample of five plants randomly harvested within each useful portion. For the severity evaluation, scores from 1 to 9 (where 1=0) were attributed, a range proposed by Schoonhoven and Pastor-Corrales (1987), where: 1=without visible symptoms; 3=5 to 10% of the plant are infected; 5=20 to 30% of the plant are infected; 7=40 to 60% of the plant are infected; 9=more than 80% of the plant is infected. The scores were converted into percentages by the infection index proposed by Mckitmey (1923). All evaluations were made 3, 7, 10, 14 and 21 days after the emergence (DAE). The productivity of the crop was estimated in kilograms per hectare, and the grains harvested in 7.0 m$^2$ of each useful portion were weighed on an analytic scale. During the experiment, the crop was monitored for the purpose of registering the occurrence of any phytotoxicity symptoms caused by the products to bean plants.

Statistical analysis: The data of evaluations of the incidence, severity and productivity were transformed using equation $\sqrt{x+1}$ and submitted to variance analysis. The area below the progress of the severity of the disease (ABPSD) curve was calculated according to Campbell and Madden (1990). The comparisons of the averages were made by carrying out Tukey test ($p \leq 0.05$) (1974), and the effectiveness of the treatments was calculated according to Abbot (1925).

Results and Discussion

As to the incidence of the disease, symptomatic plants could be observed in all studied treatments, also in the negative control, wherein seeds without contacting fungi were used. This fact demonstrates the contamination of the ground deriving from previous harvests, and the experiment was installed in an area already having an inoculum source for *R. solani*. This situation is common and repeats in almost all the culture regions in Brazil, since *R. solani* is a cosmopolitan fungus that survives in the ground as sclerotia from one harvest to another. Thus, the importance of providing effective and environmentally safe strategies for handling this fungus is evidenced. At the 3$^{rd}$ and 7$^{th}$ DAE, the biological formulation did not differ statistically from the overall control, that is, it does not decrease the incidence of the disease. Since it is a biological product, time is required for the development of organisms that make up the product and for the subsequent establishment of such populations in the ryzospheric community of the crop, thus enabling effective action of said organisms against the target phytopathogen. This action can be seen at the 10$^{th}$ DAE, when all the evaluated doses of the biological formulation reduced the incidence of sick plants from 40 to 90%; this "protective" effect lasted until the last evaluation at the 21$^{st}$ DAE (Table 8).

TABLE 8

Effect of the treatments on the incidence of R. solani in bean plants (P. vulgaris), Pearl cultivar, throughout the evaluations. Uberlândia, MG, 2017.

| Treatments | Doses g p.c.kg seed$^{-1}$ | \multicolumn{2}{c}{Incidence of root rot in 5 plants/useful portion} | | | | | | | | |
|---|---|---|---|---|---|---|---|---|---|---|---|
| | | 3 DAE | | 7 DAE | | 10 DAE | | 14 DAE | | 21 DAE | |
| | | m† | E(%) | m† | E(%) | m† | E(%) | m† | E(%) | m† | E(%) |
| Negative control | — | 2.75 a | 0.00 | 1.25 a | 58.33 | 1.75 a | 30.00 | 1.00 b | 66.67 | 1.75 a | 46.15 |
| Inoculated control | — | 1.50 a | — | 3.00 b | — | 2.50 b | — | 3.00 b | — | 3.25 b | — |
| Biological Formulation | 0.45 | 2.25 a | 0.00 | 3.25 b | 0.00 | 0.75 a | 70.00 | 3.00 b | 0.00 | 2.75 a | 15.38 |
| | 0.90 | 2.00 a | 0.00 | 3.00 b | 0.00 | 1.50 a | 40.00 | 2.00 a | 33.33 | 2.50 a | 23.08 |
| | 1.40 | 1.50 a | 0.00 | 3.25 b | 0.00 | 0.75 a | 70.00 | 2.00 a | 33.33 | 2.75 a | 15.38 |
| | 2.00 | 1.00 a | 33.33 | 3.00 b | 0.00 | 0.75 a | 70.00 | 2.00 a | 33.33 | 2.75 a | 15.38 |
| | 2.50 | 1.50 a | 0.00 | 2.25 b | 25.00 | 0.25 a | 90.00 | 1.75 a | 41.67 | 2.50 a | 23.08 |
| VC (%) | | 22.13 | — | 11.56 | — | 18.16 | — | 15.54 | — | 10.93 | — |
| Averages | | 1.79 | — | 2.71 | — | 1.18 | — | 2.11 | — | 2.61 | — | m: average of four repetitions (5 plants/portion);
†averages followed by the same letter do not differ from one another in the columns as per Scott Knott test(p ≤ 0.05);
DAE: days after the emergence;
g p.c. kg seeds$^{-1}$: grams of commercial product per kilogram of seeds;
ABPSD: area below the progress of the disease curve;
VC (%): coefficient of variation;
E (%): efficiency calculated by Abbott formula.

Results similar to those presented for the incidence were observed in the severity case. At the beginning of the crop development, at the 3$^{rd}$ and 7$^{th}$ DAE, the biological formulation did not control the severity of the disease, and averages similar to the averages observed for the controls were attained. However, at the 10$^{th}$ DAE, the severity in the plants derived from seeds treated with the biological formulations was statistically lower than that of the inoculated witness, attaining a 64.29 to 92.86% control for all the evaluated doses. At the 14$^{th}$ DAE there was an increase in the severity of the disease in all plants, and this advance was lower in plants treated with the biological formulation, at doses of 0.90 to 2.50 g p.c·kg seeds$^{-1}$, with a 60.66 to 85.25% difference compared to the inoculated control. Although the lowest dose (0.40 g p.c·kg seeds$^{-1}$) did not differ statistically from the inoculated control, it showed an efficiency control higher than 29%. At the 21$^{st}$ DAE, the treatments using the highest doses (0.90 to 2.5 g p.c·kg seeds$^{-1}$) were statistically higher than the severity observed in the inoculated control. As to the evolution of the disease, inside the area and the advance thereof in the plants, the treatment of seeds with the biological formulation at doses of 0.90 to 2.50 g p.c·kg seeds$^{-1}$ delayed the advance of the settling of fungi in tissues still healthy, reducing the damage to the crop. The treatment of seeds with the biological formulation at the four highest doses controlled the evolution of the disease from 47.24 to 70.66% compared to the inoculated witness (Table 9).

TABLE 9

Effect of the treatments on the severity (infection index) of R. solani in bean plants (P. vulgaris), Pearl cultivar, throughout the evaluations. Uberlândia, MG, 2017.

| Treatments | Doses g p.c.ha$^{-1}$ | \multicolumn{12}{c}{Severity (%) of root rot} | | | | | | | | | | | | |
|---|---|---|---|---|---|---|---|---|---|---|---|---|---|
| | | 3 DAE | | 7 DAE | | 10 DAE | | 14 DAE | | 21 DAE | | ABPSD | |
| | | m† | E(%) | m† | E(%) | m† | E(%) | m† | E(%) | m† | E(%) | m† | E(%) |
| Negative control | — | 25.00 a | 0.00 | 16.67 a | 70.59 | 19.44 a | 64.29 | 17.78 a | 80.33 | 30.56 a | 39.66 | 418.61 a | 57.76 |
| Inoculated control | — | 20.00 a | — | 30.00 a | — | 34.44 b | — | 45.00 b | — | 43.33 b | — | 694.72 a | — |
| Biological Formulation | 0.45 | 25.56 a | 0.00 | 27.22 a | 14.71 | 13.89 a | 88.10 | 35.00 b | 29.51 | 43.33 b | 0.00 | 577.50 b | 24.52 |
| | 0.90 | 18.89 a | 12.50 | 25.56 a | 23.53 | 19.44 a | 64.29 | 24.44 a | 60.66 | 31.67 a | 36.21 | 468.89 a | 47.24 |
| | 1.40 | 15.56 a | 50.00 | 27.22 a | 14.71 | 13.33 a | 90.48 | 23.33 a | 63.93 | 32.22 a | 34.48 | 437.50 a | 53.81 |
| | 2.00 | 16.67 a | 37.50 | 23.89 a | 32.35 | 13.33 a | 90.48 | 22.22 a | 67.21 | 30.56 a | 39.66 | 417.78 a | 57.93 |
| | 2.50 | 18.33 a | 18.75 | 19.44 a | 55.88 | 12.78 a | 92.86 | 16.11 a | 85.25 | 26.11 a | 53.45 | 356.94 a | 70.66 |
| VC (%) | | 20.52 | — | 15.06 | — | 17.41 | — | 22.87 | — | 16.01 | — | 8.06 | — |
| Averages | | 20.00 | — | 24.29 | — | 18.10 | — | 26.27 | — | 33.97 | — | 481.71 | — | m: average of four repetitions (5 plants/portion);
†averages followed by the same letter do not differ from one another in the columns as per Scott-Knott test (p ≤ 0.05);
DAE: days after emergence;
g p.c. kg seed$^{-1}$: grams of commercial product per kilogram of seeds;
ABPSD: area below the progress of the disease curve;
VC (%): variation coefficient;
E (%): efficiency calculated by Abbott formula.

With regard to productivity of the culture, there was no significant interaction between the treatments (Table 10).

TABLE 10

Productivity of bean plants (*P. vulgaris*), Pearl cultivar, as a function of the treatments applied. Uberlândia, MG, 2017.

| Treatments | Doses p.c.kg seed$^{-1}$ | Productivity kg · ha$^{-1}$ m† | IR % |
|---|---|---|---|
| 1. Witness | — | 2541.01 a | 19.79 |
| 2. Inoculated witness | — | 2121.23 a | — |
| 3. AGVL006 | 0.45 | 2219.62 a | 4.64 |
| 4. AGVL006 | 0.90 | 2406.20 a | 13.43 |
| 5. AGVL006 | 1.40 | 2487.53 a | 17.27 |
| 6. AGVL006 | 2.00 | 2469.49 a | 16.42 |
| 7. AGVL006 | 2.50 | 2412.44 a | 13.73 |
| VC (%) | | 9.63 | |
| Averages | | 2379.65 | | m: average of four repetitions;
†averages followed by the same letter do not differ from one another in the columns as per Scott-Knott test ($p \leq 0.05$);
g p.c. kg seed$^{-1}$: grams of commercial product per kilogram of seed;
kg · ha$^{-1}$: kilograms per hectare;
IR: increment in the productivity in relation to witness;
VC (%): variation coefficient Therefore, in view of the presented results, the effect of the biological formulation in the treatment of seeds for controlling root rot (*R. solani*) in bean plants was evidenced, and it can be recommended as a phytosanitary practice in the integrated handling of this crop.

CONCLUSIONS

The combinations of 1) bacteria *Bacillus amyloliquefaciens*, fungi *Clonostachys rosea*, and *Trichodenua harzianum*, and 2) *Bacillus amyloliquefaciens* and *Trichoderma harzianum* are viable alternatives to the use of chemical fungicides. Further, when combining the several mechanisms for controlling said specific micro-organisms, these biological formulations extend the beneficial effects of these control agents to the mitigation of all damages caused by phytopathogens.

The preparation of the formulation should follow the following flow of events:
Raw material: the raw materials that will make up the product should be received and handled by trained people;
Mixture: the raw materials should be weighed and mixed following the standard operational procedure (SOP) at the suggested ratios;
Sampling: after the mixing, samples should be taken for the verification and certification of guarantees of the product. The number of colony-forming units c.f.u./g of product should be analyzed;
Packing: the formulated product that is within the guarantee specifications should be packed in previously labeled 1.0 and 10.0 kg plastic bags. The pots are sealed and closed using a cover;
Storage: the vials are accommodated in pallets and stored in a dry, ventilated place protected from light, and kept under these conditions until they are sent away.

The present invention may be applied as a treatment for seeds, a seeding line application and spraying over the entire area for controlling phytopathogenic fungi. The application method will have to be analyzed case by case and will depend on the technical conditions and needs of each planter.

ADVANTAGES OBTAINED

The attained composition for biologically controlling phytopathogenic fungi offers the following advantages:
It is an alternative to the use of chemical fungicides, and meets the needs of the society for more environmentally safe products;
It exploits a wider range of mechanisms of action against phytopathogenic fungi, thus assuring higher efficiency;
It reduces the selection of phytopathogens resistant to chemical products; and
It provides a versatile application (through seeding lines, treatment of seeds and foliar spraying), making it easy to be applied in several cultivation systems.

It should be understood that the preferred embodiments mentioned here are merely illustrative of the present invention. Numerous variations in design and use of the present invention may be contemplated in view of the following claims without straying from the intended scope and field of the invention herein disclosed.

BIBLIOGRAPHIC REFERENCES

Abdullah M T, Ali N Y, Suleman P (2008) Biological control of *Sclerotinia sclerotiorum* (Lib.) de Bary with *Trichoderma harzianum* and *Bacillus amyloliquefaciens*. Crop Protec 27: 1354-1359.

Bardin S D, Huang H C (2001) Research on biology and control of *Sclerotinia* diseases in Canada. Can J Plant Pathol 23:88-98.

Boland G J, Hall R (1994) Index of plant hosts of *Sclerotinia sclerotiorum*. Can J Plant Pathol 16:93-108.

Bolton M D, Thomma B P H J, Nelson B D (2006) *Sclerotinia sclerotiorum* (Lib.) de Bary: biology and molecular traits of a cosmopolitan pathogen. Mal Plant Pathol 7:1-16.

Campbell C L, Madden L V (1990) Introduction to Plant Disease Epidemiology. New York. John Wiley & Sons.

Campion C, Chatot C, Perraton B, Andrivon D (2003) Anastomosis groups, pathogenicity and sensitivity to fungicides of *Rhizoctonia solani* isolates collected on potato crops in France. Eur J Plant Pathol 109:983-992.

Canova S P, Petta T, Reyes L F, Zucchi T D, Moraes L A B, Melo I S (2010) Characterization of lipopeptides from *Paenibacillus* sp. (1IRAC30) suppressing *Rhizoctonia solani*. World J Microbiol Biotechnol 26:2241-2247.

Faltin F, Lottmann J, Grosch R, Berg G (2004) Strategy to select and assess antagonistic bacteria for biological control of *Rhizoctonia solani* Kuhn. Can J Microbiol 50:811-820.

Fernando W G D, Nakkeeran S, Zhang Y, Savchuk S (2007) Biological control of *Sclerounia sclerouorusn* (Lib.) de Bary by *Pseudomonas* and *Bacillus* species on canola petals. Crop Prot 26: 100-107

Koenning, S. R., & Wrather, J. A. (2010). Suppression of soybean yield potential in the continental United States by plant diseases from 2006 to 2009. Plant Health Progress, 10.

McKinney H H (1923) Influence of soil, temperature and moisture on infection of whea seedlings by *Helminthosporium sativum*. Journal of Agricultural Research 26: 195-217, Ogoshi A (1996) The genus *Rhizoctonia*. In: Sneh B, Jabli-Hare S, Neate S, Dijst G (eds) *Rhizoctonia* species: taxonomy, molecular biology, ecology, pathology and disease control. Kluwer, Dordrecht, pp 1-9, Ohkura M, Abawi G S, Smart C D (2009) Diversity and aggressiveness of *Rhizoctonia solani* and *Rhizoctonia*-like fungi on vegetables in New York. Plant Dis 93:615-624.

Raaijmakers I M, Vlami M, de Souza I T (2002) Antibiotic production by bacterial biocontrol agents. Antoine van Leeuwenhoek 81: 53 7-547 Schoonhoven A, Pastor-Corrales M A (1987) Sistema estándar para la evaluación del germoplasma de frijol. Cali, Colombia. CIAT.

Scott A, Knott M (1974) Cluster-analysis method for grouping means in analysis of variance. Biometrics 30:507-512.

Siddiqui Z A (2005) PGPR: prospective biocontrol agents of plant pathogens. In PGPR: biocontrol and biofertilization (pp. 111-142). Springer Netherlands.

Zhang C Q, Liu Y H, Ma X Y, Feng Z, Ma Z A (2009) Characterization of sensitivity of *Rhizoctonia solani*, causing rice sheath blight, to mepronil and boscalid. Crop Prot 28:381-386.

Zucchi T D, Almeida L G, Dossi F C A, Cônsoli F L (2010) Secondary metabolites produced by *Propionicimonas* sp. (ENT-18) induce histological abnormalities in the sclerotia of *Sclerotinia sclerotiorum*. BioControl 55:811-819.

Zucchi T D, Moraes L A B, Melo I S (2008) *Streptomyces* sp. ASBV-1 reduces aflatoxin accumulation by *Aspergillus parasiticus* in peanut grain. J. Appl. Microbiol. 105:2153-2160.

The invention claimed is:

1. A composition for biologically controlling phytopathogenic fungi, consisting of:

a) *Bacillus amyloliquefaciens* in $1.0 \times 10^7$ colony forming units (cfu)/g;
b) *Trichoderma harzianum* in $1.0 \times 10^7$ cfu/g;
c) *Clonostachys rosea* in $1.0 \times 10^6$ cfu/g
d) additives; and
e) excipients;

wherein *Bacillus amyloliquefaciens* is present in a concentration of 1.0 to 20.0%, *Trichoderma harzianum* is present in a concentration of 1.0 to 45.0%, *Clonostachys rosea* is present in a concentration of 1.0 to 15.0% the additives are present in a concentration of 1.0 to 10.0%, and the excipients are present in a concentration of 10.0 to 96.0%.

2. The composition for biologically controlling phytopathogenic fungi according to claim 1, wherein the additives are dispersants selected from the group consisting of: water-soluble ionic polymers and water-soluble anionic polymers; surfactants selected from the group consisting of: anionic surfactants and non-ionic surfactants; and combinations thereof.

3. The composition for biologically controlling phytopathogenic fungi according to claim 1, wherein the excipients are selected from the group consisting of: silicas, talc, bentonite, carbohydrates, and combinations thereof.

4. The composition for biologically controlling phytopathogenic fungi according to claim 1, wherein the composition is in a form selected from the group consisting of a wettable powder, a concentrated emulsion, a concentrated suspension, and granules.

* * * * *